Figure 2:
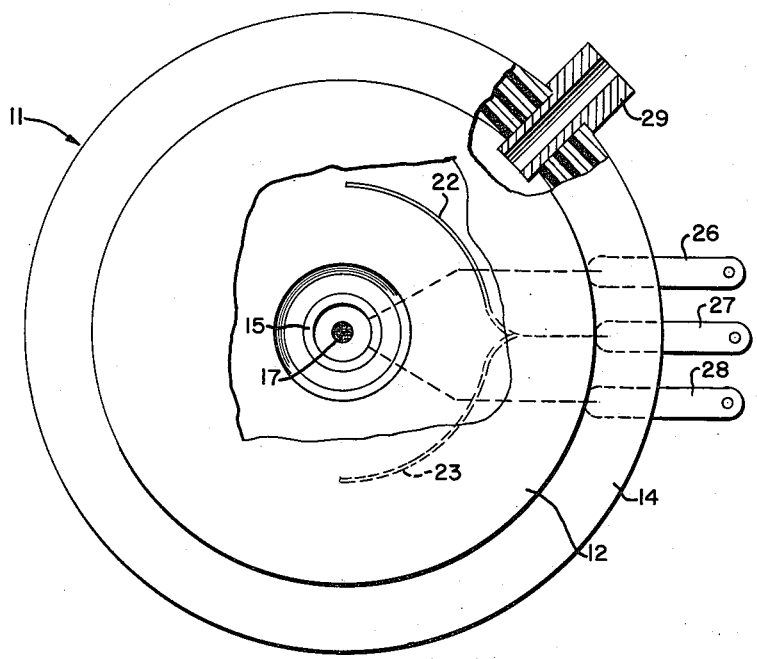

Jan. 7, 1964

J. B. McQUITTY 3,116,635

FULL WAVE PRESSURE DETECTOR

Filed June 28, 1960

2 Sheets-Sheet 1

INVENTOR.
J. B. McQUITTY 3,116,635
FULL WAVE PRESSURE DETECTOR
Jim B. McQuitty, Adelphi, Md., assignor to the United
States of America as represented by the Secretary of
the Navy
Filed June 28, 1960, Ser. No. 39,411
17 Claims. (Cl. 73—141)
(Granted under Title 35, U.S. Code (1952), sec. 266)

The invention described herein may be manufactured and used by or for the Government of the United States of America for governmental purposes without the payment of any royalties thereon or therefor.

This invention relates to electrochemical flow, pressure or force detectors and more particularly to such detectors that may be used to ascertain the direction of such forces.

This invention is an improved electrochemical pressure responsive element of the type disclosed in U.S. Patent 2,896,095, issued July 21, 1959 to H. B. Reed et al. In the apparatus described by the aforementioned patent, pressure is applied to a container having compliant diaphragms and a pair of chambers which are interconnected by a cathode capable of passing fluid. An anode is inserted in each of the chambers and a voltage source is connected between the anode and cathode. The container is substantially filled with an electrolytic fluid having reducible ions, i.e. those capable of capturing electrons and oxidizable ions, which of course are capable of donating electrons so that oxidation occurs at the anode and reduction occurs at the cathode. When a pressure is applied to one side of the container or cell the rate of the oxidation and reduction processes increases causing increased current flow which can be measured to ascertain external pressure or flow. The operation of this simple cell is more fully explained in the above-mentioned patent.

If the direction of the applied force is changed, the simple cell is unable to detect it. Previously, full wave flow detectors, i.e. those which can determine the direction of external flow, were constructed by placing two simple cells next to each other or in "back-to-back" relationship. This resulted in a system of considerable complexity that was difficult to fabricate. Also the reliability of the prior system was poor, particularly when high amplitude oscillating pressures were applied thereto.

Accordingly, it is an object of this invention to provide a new and improved electrochemical flow detector.

Another object of this invention is to provide a new and improved flow detector capable of ascertaining the direction of applied pressures.

A further object of this invention is to provide a new and improved full wave flow detector which is simpler to manufacture, less complicated, and more accurate than those of the prior art.

Various other objects and advantages will appear from the following description of one embodiment of the invention, and the novel features will be particularly pointed out hereinafter in connection with the appended claims.

This invention contemplates the solution of these objects by using an electrochemical cell having two or more separate, adjacent, insulated cathodes and an anode disposed on either side of the cathodes. A source of potential is coupled to the anode and the cathodes in addition to external circuitry for taking the difference in the current flow between the cathodes and for determining the sum of the current flow in the cathodes. The difference measurement indicates the polarity or direction of the applied pressure and the other measurement determines total pressure.

Figure 1:
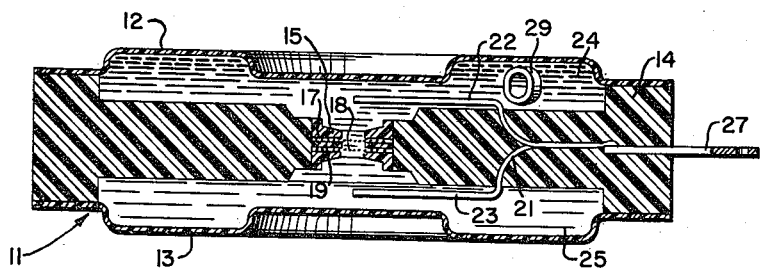
Figure 3:
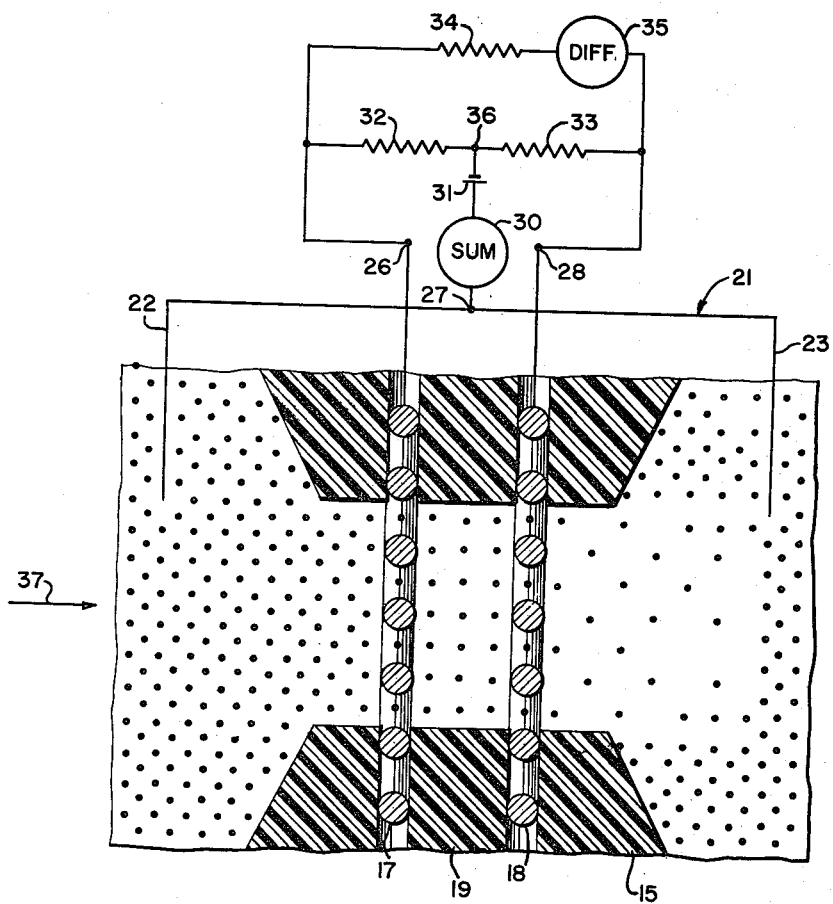

Referring now to the drawings;
FIG. 1 is a sectional view of this novel detector;
FIG. 2 is a top view of the detector illustrated in FIG. 1; and FIG. 3 is a greatly enlarged view of the central portion of FIG. 1 as well as a schematic diagram of one embodiment of an electrical measuring circuit connected thereto.

It is to be understood that like reference characters designate like or corresponding parts throughout the several figures and are used to describe this invention in detail.

FIGS. 1 and 2 illustrate a sectional view of the side elevation and a top view, respectively, of a preferred embodiment of this novel structure. A container, generally designated as 11, comprises a pair of force or pressure responsive compliant, plastic diaphragms 12 and 13 secured to opposite sides of an annular shaped member 14 made of a suitable electrical insulator, such as plastic. A ring 15 having a relatively small inner diameter compared to the outer diameter of member 14 is secured to the inner circumference of annulus 14. Ring 15 has tapered portions on each side theerof to permit liquid electrolyte 16 which is substantially filled in the container to flow easily therethrough.

A pair of porous cathodes 17 and 18 allow the electrolytic medium to flow through them. Each cathode is preferably made of platinum gauze, and is inserted in the aperture formed by the inner circumference of ring 15. These separate cathodes are insulated from each other by an annular plastic insulating spacer 19 inserted therebetween, as better shown in FIG. 3.

Anode 21, having a pair of arms 22 and 23 which are inserted in chambers 24 and 25, respectively, is imbedded in annular member 14. The anode has been shown as extending to the aperture formed by ring 15 but it is to be understood that it need only communicate with any portion of the electrolyte with which the chambers 24 and 25 are filled. Anode 21 is electrically connected to terminal 27 while cathodes 17 and 18 are coupled to terminals 26 and 28, respectively, which terminals are secured to member 14 by any suitable means.

An appropriate liquid electrolyte, such as an aqueous solution containing a large amount of potassium iodide and a small concentration of iodine is poured into the container through filling port 29, until the chambers are substantially filled. The concentration of pure iodine is adjusted to give the desired sensitivity and conveniently ranges from 0.01 to 0.1 normal. When iodine and potassium iodide are dissolved in water, the $I_3^-$ [triiodine] and $I^-$ [iodide] ions are formed as well as the $K^+$ [potassium ion]. Any other suitable electrolyte having reducible and oxidizable ions may be utilized, such as disclosed by the previously mentioned patent to Reed et al.

Referring now to FIG. 3 of the drawings, there is disclosed a greatly enlarged cross-sectional view of the aperture formed by ring 15, spacer 19 and the cathodes 17 and 18. Battery 31 supplies a positive bias to anode 21 with respect to cathodes 17 and 18 by way of resistors 32 and 33 and ammeter 30. The bias voltage must be selected so that the solution will not decompose. For an aqueous solution containing iodine and potassium iodide the voltage between the anode and cathode should not exceed 0.9 volt.

If the container is placed in an environment so that diaphragm 12 is deformed inwardly by force or pressure applied thereto, the electrolytic liquid will flow from chamber 24 through the small aperture in ring 15, and the cathodes 17 and 18 to chamber 25. This direction of applied pressure is shown in FIG. 3 by arrow 37. The concentration of reactable ions, i.e. the triiodide or $I_3^-$ ions, which will pass into cathode 17 is proportional to the external flow or pressure applied to the cell. The number of dots on the diagram represents the reactable $I_3^-$ ion concentration at particular locations in the cell.

At cathode 17 a $I_3^-$ ion combines with two electrons to form three iodide [I⁻] ions thus passing a current through resistor 32. Simultaneously at anode 21 three iodide ions give up two electrons to the anode and form the $I_3^-$ ion in solution. When the solution passes through cathode 17, the number of reactable $I_3^-$ ions is decreased by a certain proportion. As the solution flows through cathode 18, the triiodide ion is further reduced by a certain proportion causing current to flow through resistor 33. Since the number of $I_3^-$ ions reacting with cathode 17 is greater than that reacting with cathode 18, there will be greater current flow through resistor 32 than through resistor 33. It is thus apparent that the surface area of cathodes 17 and 18 must be substantially equal so that the reaction at both will be of identical efficiency. After the solution passes through cathode 18 the number of reactable ions is further decreased. The $I_3^-$ ions that are not reduced by either cathode pass to the other chamber 25. The fluid passing into chamber 25 mixes with the liquid therein and quickly returns to its initial concentration of iodide and triodide ions by the action of the anode arm 23. As the cathode 18 is giving up electrons to form three [I⁻] ions from an $I_3^-$ ion, three iodide ions give up two electrons to the anode 23 and form an $I_3^-$ ion in the solution at that point. The fact that both arms 22 and 23 of the anode are connected to each other prevents a steady state condition in which the concentration of iodide and triodide ions in the two chambers will differ from one another. The necessary ions to return both chambers to original concentration will flow through the short circuit between the arms as a natural consequence of any imbalance. Thus, the device has no response to a steady state pressure since no current flows between anode and cathode elements unless the liquid is moving through the pair of cathodes.

The direction of current flow through resistor 34 and D.C. ammeter 35, which are connected in parallel with resistors 32 and 33, indicates the direction in which the pressure is applied to the cell. Of course, it is to be understood that resistor 34 must be of considerably greater magnitude than resistors 32 and 33. In the example previously described, current will pass through these elements from left to right, as viewed on FIG. 3, causing a positive deflection of the ammeter needle. If the applied pressure or force is applied in the opposite direction the current through meter 35 will be from right to left causing negative deflection of the needle since the same reactions take place in the opposite direction in the cell thus causing current to flow in the opposite direction through resistor 34 and D.C. ammeter 35 producing an opposite reaction of the ammeter. If the forces applied to opposite diaphragms 12 and 13 of the cell are in phase and equal, the reactions at both cathodes 17 and 18 will be identical and very small causing no deflection of meter 35. Thus, the direction of the applied resultant force or flow may be determined by meter 35. If it is also desired to measure the amount as well as the direction of flow, D.C. ammeter 30 is connected between battery 31 and anode 21. The currents flowing through resistors 32 and 33 are added at the node 36 between them and the resulting combined current is read on meter 30. This meter may be calibrated in terms of flow or pressure applied to the container.

It should be apparent that any suitable loads, such as magnetic amplifiers, may be substituted for the ammeters so that the detector current can actuate any appropriate apparatus. Also, the sensitivity of the cell can be varied by increasing or decreasing the reactable ion concentration of the electrolytic solution. If it is desired to obtain different non-linear functions of the solution flow, the number or density of gauzes utilized in a particular cathode may be increased. By so increasing the cathode surface area the output current will be changed to a substantially linear function from functions of different powers less than one of solution flow.

The device can be modified by inserting a third cathode between cathodes 17 and 18 and connecting it directly to the negative terminal of battery 31. This modification permits the current flowing through meter 35 to be greater for large amplitude signals. If it is desired to provide a unit responsive to flows in excess of a predetermined value, a meter can be directly connected between the middle cathode and the negative terminal of the battery. With such an arrangement the cathode 17 and 18 are directly connected to the negative terminal of the battery while the middle or third cathode is connected to the negative terminal by way of an ammeter. This design can be further modified by inserting a fourth cathode adjacent to the third cathode and by connecting a voltmeter between the second and third cathodes. This construction permits the direction of flow to be ascertained in addition to providing a unit that is responsive to flows only in excess of a predetermined value.

There has herein been disclosed a novel electrochemical pressure or force actuated cell which is responsive to the direction of the applied flow, force or pressure by utilizing a pair of cathodes in a single container. An electrical circuit is connected to the cathodes which indicates the direction of flow as well as the total flow of the electrolyte within the unit.

It will be understood that various changes in the details, materials and arrangements of parts, which have been herein described and illustrated in order to describe the nature of the invention, may be made by those skilled in the art within the principles and scope of the invention as expressed in the appended claims.

What is claimed is:

1. A full wave flow detector comprising a container having compliant force responsive elements; a single liquid electrolytic medium substantially filling said container; an anode immersed in said medium; and a pair of separate, mutually spaced, insulated cathodes immersed in said medium, each of said cathodes being capable of passing said medium therethrough and successively removing electrons therefrom, and an electric circuit means attached to said anode and said cathodes for indicating the direction and amount of said medium passing through said cathodes.

2. The detector of claim 1 wherein said anode has a pair of arms, one of said arms being disposed in proximity to one of said cathodes, and the other of said arms being disposed in proximity to the other of said cathodes.

3. The detector of claim 1 wherein each of said cathodes comprises at least one porous platinum gauze.

4. The detector of claim 1 wherein said medium comprises an aqueous solution containing predetermined quantities of potassium iodide and iodine.

5. The detector of claim 1 wherein said circuit means comprises means coupled to both of said cathodes and to said anode for providing potentials therebetween, and means coupled to said cathodes for measuring the difference between the currents therein.

6. The detector of claim 5 wherein said circuit means further comprises means coupled to both of said cathodes for measuring the sum of the currents therein.

7. A full wave flow detector comprising a container having diaphragm means; an electrical insulator of annular shape mounted on an interior wall of said container defining two portions of said container with the inner diameter providing a passage therebetween; a pair of separate mesh platinum gauze cathodes secured across the inner diameter of said insulator; an aqueous solution containing predetermined quantities of potassium iodide and iodine and substantially filling said contaner; an anode immersed in said solution and extending on both sides of said insulator; said solution flowing through said cathodes by movement of said diaphragm means whereby currents between said anode and said cathodes are indicative of the direction and distance of said movement.

8. The detector of claim 7 further comprising a D.C. power source coupled to both of said cathodes and to said anode; a first measuring means connected between said cathodes for measuring the difference between the currents therein; and a second measuring means coupled to said source and to said anode for measuring the sum of the currents in both of said cathodes.

9. A full wave flow detector comprising a container having two separate chambers and an interior aperture connecting said chambers, each of said chambers having compliant diaphragms forming a portion of the exterior surfaces thereof, a liquid electrolyte substantially filling said container and contacting said diaphragms, a plurality of insulated cathodes located within the aperture, each of said cathodes being capable of passing said electrolyte therethrough, and an anode, said anode located in each of said chambers.

10. The detector of claim 9 wherein each of said cathodes comprises a mesh metal gauze and said electrolyte comprises a solution containing reducible and oxidizable ions.

11. A force responsive detector comprising a container having two interconnecting chambers, the exterior of each chamber comprising a compliant plastic diaphragm, each of said chambers being filled with an aqueous solution containing potassium iodide and iodine, said solution contacting said diaphragm, a plurality of mesh platinum gauze cathodes mounted between said chambers and containing said solution, insulation means to physically and electrically separate said cathodes, an anode, said anode located in each of said chambers.

12. A full-wave detector comprising an electrolyte, a restricted passage immersed in said electrolyte, said passage being adapted for electrolyte flow therethrough, a plurality of separate cathodes disposed within said passage in the direction of electrolyte flow for removing electrons from said electrolyte in close proximity thereto, and means connected to said cathodes for measuring the difference in current in each of said cathodes, whereby the direction of electrolyte flow is indicated.

13. The full-wave detector of claim 12 further comprising means connected to said cathodes for measuring the total current flow in each of said cathodes, whereby the amount of electrolyte flow is determined.

14. The full-wave detector of claim 12 wherein said cathodes comprise a conductive mesh across said passage.

15. A fluid pressure detector comprising an electrolyte fluid, means for producing a flow of said electrolyte in response to a fluid pressure, a plurality of electrode means for changing the ion concentration of said electrolyte flowing thereby, said plurality of electrode means being disposed in said electrolyte flow in sequence along the direction of flow whereby each said electrode means sequentially changes the ion concentration of the electrolyte as it flows thereby, the rate of ion concentration change being indicative of said fluid pressure, and electric circuit means connected to said electrode means for indicating the direction and amount of electrolyte passing through said electrode means whereby the direction and amount of pressure on said detector may be ascertained.

16. The fluid pressure detector of claim 15 wherein said electric circuit means further includes first indicating means connected to said plurality of electrode means for measuring the change in ion concentration by each electrode means, whereby the direction of flow is indicated.

17. The fluid pressure detector of claim 16 wherein said electric circuit means further comprises second indicating means connected to said electrode means for measuring the total change in ion concentration by all electrode means, whereby the amount of said flow is indicated.

References Cited in the file of this patent
UNITED STATES PATENTS

| | | |
|---|---|---|
| 2,685,025 | Root | July 27, 1954 |
| 2,769,929 | Hardway | Nov. 6, 1956 |
| 3,056,908 | Estes | Oct. 2, 1962 |

OTHER REFERENCES

Hurd et al.: "Principles of Very Low Power Electrochemical Control Devices," Journal of the Electrochemical Society, vol. 104, number 12, pp. 727–730, December 1957.